United States Patent [19]

Avnon

[11] Patent Number: 4,662,396

[45] Date of Patent: May 5, 1987

[54] CONNECTOR ASSEMBLY PERMITTING QUICK ATTACHMENT AND DETACHMENT OF FLUID CONDUITS

[75] Inventor: Mordechi Avnon, Halutza, Israel

[73] Assignee: Sagiv Mashavei Sadeh, Kibbutz Mashavei Sadeh, Israel

[21] Appl. No.: 802,441

[22] Filed: Nov. 27, 1985

[30] Foreign Application Priority Data

Dec. 28, 1984 [IL] Israel ......................................... 73962

[51] Int. Cl.$^4$ .......................... F16K 27/08; F16L 37/28
[52] U.S. Cl. ................................. 137/616.7; 137/382; 251/149.9; 251/349
[58] Field of Search ..................... 137/382, 616, 616.7; 251/149.9, 349

[56] References Cited

U.S. PATENT DOCUMENTS

| | | | |
|---|---|---|---|
| 4,200,123 | 4/1980 | Brandelli | 137/616 |
| 4,420,022 | 12/1983 | Londry | 137/382 |

FOREIGN PATENT DOCUMENTS

| | | | |
|---|---|---|---|
| 2150631 | 4/1973 | Fed. Rep. of Germany | 137/382 |
| 701851 | 3/1931 | France | 137/616.7 |
| 1008934 | 5/1952 | France | 137/616.7 |
| 2028653 | 9/1970 | France . | |
| 2068039 | 8/1971 | France . | |
| 2466696 | 6/1982 | France . | |

Primary Examiner—A. Michael Chambers
Attorney, Agent, or Firm—Benjamin J. Barish

[57] ABSTRACT

A connector assembly for fluid conduits comprises a first fitting including a connector to one of the conduits, a second fitting to which the first fitting is attachable and which includes a connector to the other of the conduits, and a swivel member within the second fitting swivable either to an open position establishing communication between the two connectors, or to a closed position blocking communication between the two connectors. The two fittings include interlocking elements which permit the first fitting to be attached to and detached from the second fitting only when the swivel member is in its closed position.

7 Claims, 12 Drawing Figures

CONNECTOR ASSEMBLY PERMITTING QUICK ATTACHMENT AND DETACHMENT OF FLUID CONDUITS

BACKGROUND OF THE INVENTION

The present invention relates to connector assemblies for fluid conduits, and particularly to a connector assembly permitting the quick attachment and detachment of fluid conduits to each other.

One example of an application of the connector assembly of the present invention is in gas supply lines, particularly for gas heaters. Thus, in order to enable a gas heater to be used at different locations, the supply line for the heater may be equipped with a fitting which is attachable to any one of a number of other fittings connected to the gas source. In such fittings, however, there is a danger of the escape of gas particularly when the heater fitting is detached from the source fitting.

An object of the present invention is to provide a connector assembly particularly useful for the above application and permitting the quick attachment and detachment of the two fittings in a safe and convenient manner.

SUMMARY OF THE INVENTION

According to a broad aspect of the present invention, there is provided a connector assembly for fluid conduits comprising: a first fitting including a connector for one of the conduits; a second fitting to which the first fitting is attachable and which includes a connector for the other conduit; and a swivel member within the second fitting. The swivel member is formed with a passageway and is swivable either to an open position establishing communication via its passageway between the two connectors, or to a closed position blocking communication between the two connectors. The connector assembly further includes attaching means carried by the two fittings enabling the first fitting to be attached to the second fitting and to move the swivel member to either of its two positions. The latter attaching means includes interlocking elements carried by the two fittings which permit the first fitting to be attached to and detached from the second fitting only when the swivel member is in its closed position.

According to a preferred feature of the present invention, the swivel member has a curved surface through which the passageway is formed; The swivel member is swivelly mounted between a pair of spaced pins carried by the second fitting on opposite sides of the swivel member. The second fitting further includes a bore alignable with the passageway through the swivel member in its open position. A first sealing ring is carried by the second fitting circumscribing the bore and bearing against the curved outer surface of the swivel member. Two further sealing rings are carried by the second fitting each circumscribing one of the pins and bearing against the outer surface of the swivel member. Such a construction better asures a perfect seal in all positions of the swivel member; in addition it automatically vents the first fitting to the atmosphere when the swivel member is first moved to its closed position and before the first fitting can be detached from the second fitting, thereby providing an important safety feature when the connector assembly is used for supplying compressed air to a compressed-air driven device.

Further features and advantages of the invention will be apparent from the description below.

BRIEF DESCRIPTION OF THE DRAWINGS

The invention is herein described, by way of example only, with reference to the accompanying drawings, wherein.

DESCRIPTON OF PREFERRED EMBODIMENTS

The Embodiment of FIGS. 1-4

Figure 1:
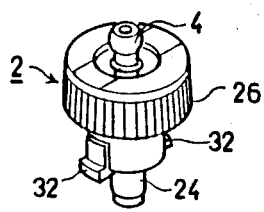
FIG. 1 is a three-dimensional exploded view illustrating the main components of one form of connector assembly constructed in accordance with the present invention.

The connector assembly illustrated in FIGS. 1-4 of the drawings is particularly for use in a gas supply system, wherein gas from a source is to be supplied via the connector assembly to a gas utilization device, such as a gas heater. FIG. 1 illustrates the three main components of the connector assembly, namely: a first fitting 2 including a connector 4 for connection to the conduit of the gas heater; a second fitting 6 including a connector 8 having a bore 9 for connection to the conduit to the gas source; and a cover 10 enclosing fitting 6. Fitting 6 may be mounted to a wall by mounting lugs 12. Cover 10 is formed with an opening 14 to permit fitting 2, carried by the conduit of the gas heater, to be attached to fitting 6. A cut-out 16 through the side wall of cover 10 accomodates connector 8 of fitting 6. The cover further includes a shutter 18 movable by a slidable button 20 to close opening 14 when fitting 2 is detached from fitting 6.

Figure 2:
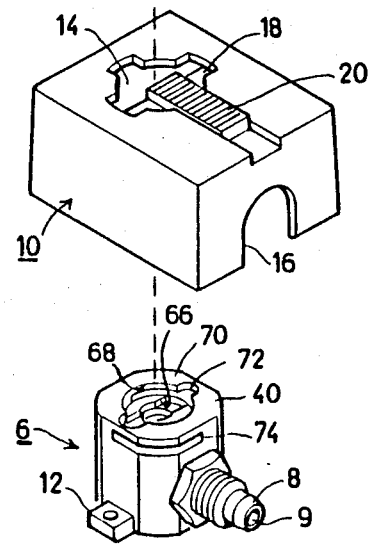
FIG. 2 is a sectional view of one of the fittings in the assembly of FIG. 1.
Figure 2:
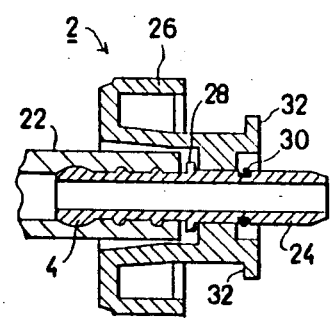
Figure 3:
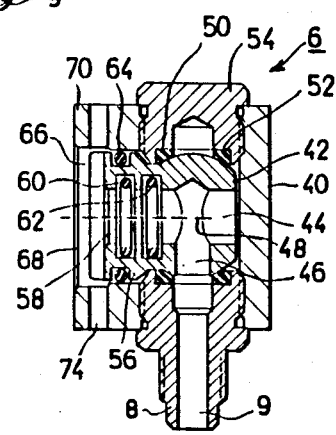
FIG. 3 is a sectional view of the other fitting in the assembly of FIG. 1.
Figure 4:
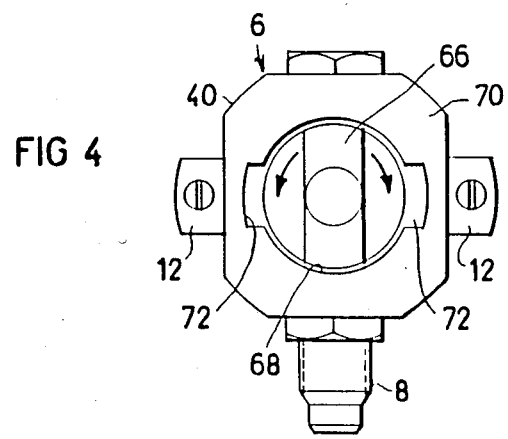
FIG. 4 is a front elevational view of the fitting of FIGS. 1-3.

The construction of fitting 2 is more particularly illustrated in FIG. 2, and the construction of fitting 6 is more particularly illustrated in FIGS. 3 and 4.

With reference to FIG. 2, the conduit attachable to connector 4 is shown at 22. This conduit leads to the heater to be supplied with gas. Connector 4 is defined by one end of a cylindrical sleeve; the opposite end of the sleeve serves as a hollow stem 24 for insertion into fitting 6. Fitting 2 further includes an annular collar 26 which is grippable by the user for attaching or detaching the fitting. Collar 26 is fixed to stem 24 by an annular rib 28 formed on the stem and engageable with one side of the collar. The stem further includes a retainer ring 30 engageable with the other side of the collar.

The side of collar 26 facing stem 24 is formed with a pair of lugs 32. These lugs serve as keys which permit fitting 2 to be attached to and detached from fitting 6 only in a predetermined condition of fitting 6, as described below.

Fitting 6, as shown in FIGS. 3 and 4, comprises a housing 40 in which is disposed a swivel member 42. The latter member is formed with a longitudinal bore 44 and with a cross-bore 46 such that, in the "open" position of the swivel member illustrated in FIG. 3, the two bores establish communication to connector 8 of fitting 2. Swivel member 42, however, may be swiveled or rotated about its axis 48, namely perpendicular the axis of bore 9 in connector 8, to a "closed" position, wherein the cross-bore 46 is out of alignment with bore 9 of connector 8, and therefore blocks communication to that connector.

Cross-bore 46 is formed through a spherical surface of the swivel member 42. Housing 40 includes two sealing rings 50, 52, bearing against the spherical surface of swivel member 42 on opposite sides of its bore 46, thereby effecting a fluid tight seal from connector 8 except when the swivel member is located so as to align its bore 46 with bore 9 of connector 8. The two sealing rings 50, 52 are pressed against the spherical face of swivel member 42 by connector 8 threaded into a bore through one side of housing 40, and by a cap 54 threaded into a bore on the opposite side of the housing.

The outer side of swivel member 42 is extended to define a stem 56. Bore 44 through swivel member 42 also passes through this stem, to thereby define a socket 58 for receiving stem 24 of fitting 2. Socket 58 is lined with two further sealing rings 60, 62 engageable with the outer face of stem 24, when inserted therein; and a further sealing ring 64 is applied between the outer face of stem 56 and housing 40.

The outer end of stem 56, namely the end facing fitting 2, is formed with a diametrical recess 66 of a width corresponding to the distance between the opposite ends of keys 32 of fitting 2 for receiving fitting 2. Fitting 2 may be rotated to swivel member 42 from from its open position, wherein its cross-bore 46 is in alignment with bore 9 through connector 8 to define a passageway establishing communication between bore 44 of the swivel member and bore 9 of connector 8, or to a closed position wherein cross-bore 46 is out of alignment with bore 9 of connector 8 thereby blocking this communication.

An opening 68 is formed in the outer end wall 70 of housing 40 in alignment with recess 66 in stem 56. Opening 68 is of a diameter smaller than the distance between the opposite ends of the two keys 32 formed in fitting 2, so as normally to prevent the insertion of connector 24 of fitting 2 into socket 58 of fitting 6. However, end wall 70 is formed with a pair of opposed slots 72 dimensioned to accomodate keys 32 when recess 66 in stem 56 of swivel member 42 is in alignment with slots 72.

Housing 40 is formed with two further slots 74 through its opposite side walls. Each slot 74 starts at a point in alignment with one edge of slot 72 in end wall 70, and extends for a partion of the circumference of the side wall, e.g., for an arc of about 60°. Slots 74 are of a thickness to accomodate keys 32 when received within recess 66, and permit the keys to rotate swivel member 42 through a 60° turn, from its closed position wherein keys are aligned with slots 72, to its open position wherein the keys are out of alignment with the slots.

The connector assembly illustrated in FIGS. 1-4 operates as follows:

In the normal condition of fitting 6, wherein fitting 2 is detached therefrom, recess 66 of swivel member 42 is in alignment with slots 72 in the end wall 70 of the fitting housing 40. In this condition of swivel member 42, its cross-bore 46 is out of alignment with bore 9 through connector 8, thereby blocking communication between that connector and bore 44 of the swivel member. When fitting 2 is thus detached from fitting 6, fitting 6 is in its closed condition, and sealing rings 50, 52 effectively prevent the escape of any gas.

To attach fitting 2 to fitting 6, fitting 2 is held so that its keys 32 are aligned with slots 72 in housing 40 of fitting 6. Fitting 2 is then manipulated to pass its keys 32 through slots 72 into recess 66 of swivel member 42, and is rotated a partial turn (60°), this being permitted by slots 74 in the side walls of housing 40. At the end of the partial turn as limited by slots 74, recess 66 is in the position illustrated in FIG. 4, and cross-bore 46 in swivel member 42 is in its open position as illustrated in FIG. 3, namely in alignment with bore 9 of connector 8. Swivel member 42 now establishes communication between connector 8 of fitting 6 and connector 4 of fitting 2 via cross-bore 46 and bore 44 of fitting 6, and hollow stem 24 of fitting 2. Accordingly, gas is now supplied to the gas heater or other device to which fitting 2 is connected.

While swivel member 42 is in this open position, it is not possible to remove fitting 2 because its keys 32 are locked within recesses 74 in the side walls of housing 40. Accordingly, whenever fitting 2 is to be detached from fitting 6, it is necessary to rotate fitting 2 a partial turn to bring recess 66, together with keys 32, back into alignment with recesses 72 in the end wall 70 of housing 40. The rotation of fitting 2 to this position brings the swivel member 42 to its closed position wherein cross-bore 46 of the swivel member is out of alignment with bore 9 of connector 8, thereby blocking the flow of gas via fitting 6, sealing rings 50, 52 assuring that no gas will escape when fitting 2 has been removed from fitting 6.

Figure 5:
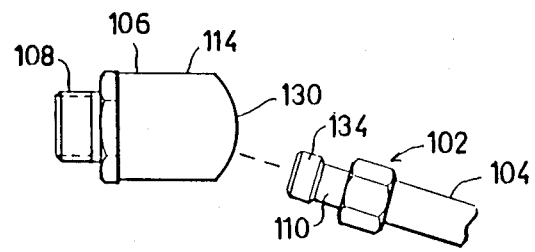
FIG. 5 is an exploded side elevational view illustrating a second connector assembly constructed in accordance with the present invention.
Figure 6:
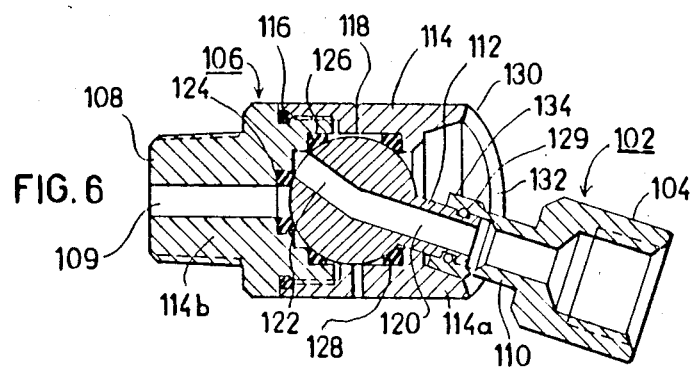
FIG. 6 is a sectional view illustrating the construction of the two fittings of FIG. 5.
Figure 7:
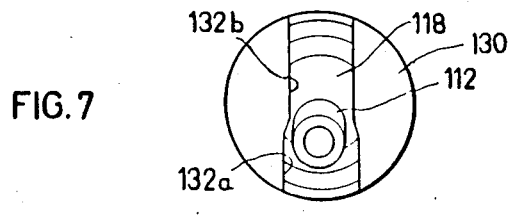
FIG. 7 is a front elevational view illustrating one of the fittings in the connector assembly of FIGS. 5 and 6.

The Embodiment of FIGS. 5-7

FIGS. 5-7 illustrate another connector assembly in accordance with the invention. This assembly includes a first fitting 102 having a connector 104 for one conduit and receivable in another fitting 106 having a connector 108 for the other conduit. Fitting 102 is formed with a hollow socket 110 adapted to receive a hollow stem 112 in fitting 106.

More particularly, fitting 106 includes a housing 114 constituted of two sections 114a, 114b threaded together and sealed by a sealing ring 116. Stem 112 within housing 114 is an extension of a ball or swivel member 118 mounted within housing 114 and formed with a bore 120 extending through stem 112 and then angled at the opposite end, as shown at 122. A pair of sealing rings 124, 126 are disposed within housing 114 and bear against the spherical surface of ball 118 on opposite sides of its bore 122. Another sealing ring 128 bears against ball 118 at the opposite side of the housing through which stem 112 projects.

Stem 112 includes a further sealing ring 129 engageable with socket 110 when fitting 102 is applied to stem 112.

Housing 114 includes a curved end wall 130 on the outer side facing fitting 102. Curved end wall 130 is formed with a slot 132 having a wide portion 132a (FIG. 7) for approximately one half its length, and a narrower portion 132b for approximately the second half.

Socket 110 of fitting 102 is formed with an annular rib 134 having an outer diameter slightly less than the wide portion 132a of slot 132, but smaller than the narrow portion 132b of the slot. Thus, socket 110 of fitting 102 can be inserted through end wall 130 of fitting 106, for receiving stem 112 of the latter fitting, only when stem 112 is located in alignment with the wider portion 132a of slot 132. As shown in FIG. 6, when stem 112 is in this position, its swivel member 118 is in its closed condition wherein angular bore 122 is out of alignment with bore 109 through connector 108, thereby blocking communication between connector 108 and connector 104 of fitting 102.

The operation of the connector assembly illustrated in FIGS. 5–7 is similar to that of FIGS. 1–4. Thus, annular rib 134 on socket 110 of fitting 102 permits the socket to be applied to stem 112 of fitting 106 only when stem 112 is in alignment with the wider portion 132a of slot 132 formed in the curved end wall 130 of fitting 106. In this position of stem 112, ball 118 is in its closed position (as illustrated in FIG. 6) wherein its bore 122 is out of alignment with bore 109 through connector 108. Fitting 102 can therefore be attached to fitting 106 only when ball 118 of the latter fitting is in its closed position.

When fitting 102 has thus been applied to fitting 106, fitting 102 may then be pivotted (upwardly in FIG. 6), as guided by slot 132, to swivel ball 118 so as to bring its bore 122 in alignment with bore 109 in connector 108. This is the open position of ball 118, and establishes communication between the two fittings. In this open condition of fitting 102, the narrow portion 132b of slot 132 in the curved end wall 130 bears against the inner end of annular rib 134 of socket 110 preventing the removal of fitting 102 from fitting 106.

Whenever it is desired to remove fitting 102, it must be moved back to its initial position to swivel ball 118 closed (FIG. 6), whereupon annular rib 134 of stem 110 is now in alignment with the wider slot portion 132a, permitting the removal of fitting 102.

Figure 8:
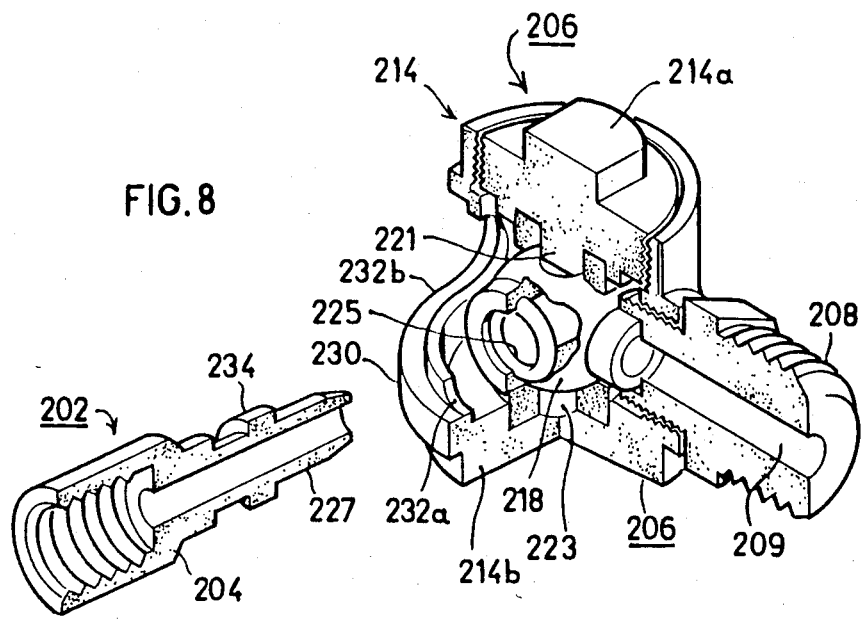
FIG. 8 is a three-dimensional view, partially broken away to show internal structure, illustrating a third connector assembly constructed in accordance with the present invention.
Figure 9:
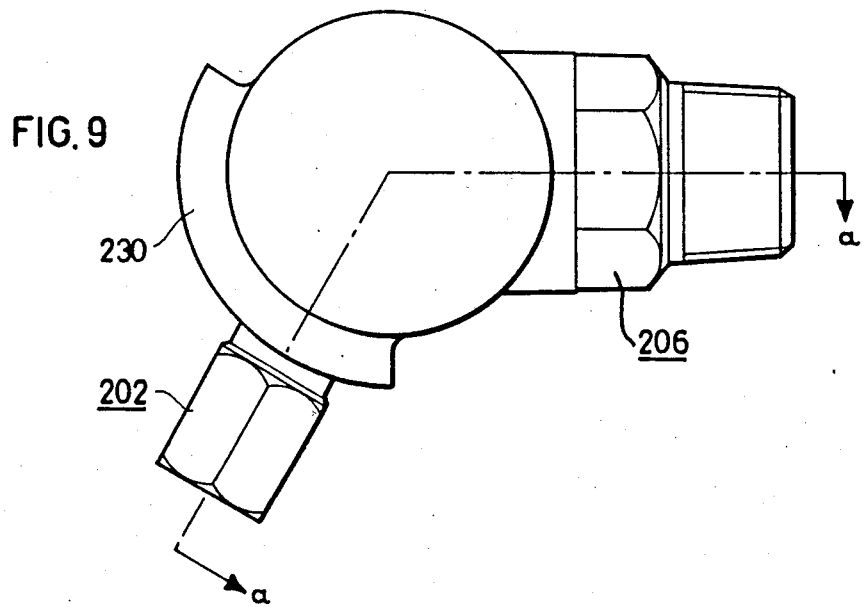
FIG. 9 is a top plan view illustrating the closed condition of the connector assembly of FIG. 8, FIG. 9a being a sectional view along lines a—a of FIG. 9.
Figure 10:
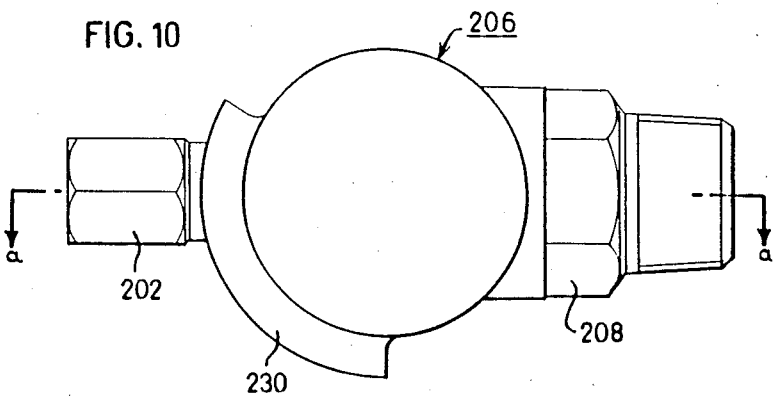
FIG. 10 is a top plan view illustrating the open condition of the connector assembly of FIG. 8, FIG. 10a being a sectional view along lines a—a of FIG. 10.

The Embodiment of FIGS. 8–10

FIGS. 8–10 illustrate a further embodiment of the invention, very similar to that of FIGS. 5–7, with the following two important differences: whereas in the embodiment of FIGS. 5–7, the swivel member (118) is formed with a stem (112) receivable within a socket (110) formed in the first fitting (102), in the embodiment of FIGS. 8–10 the swivel member is formed with the socket and receives a stem carried by the first fitting. In addition, the swivel member in the embodiment of FIGS. 8–10 is swivelly mounted between a pair of spaced pins carried by the respective fitting and extending perpendicularly to the axis of the first fitting. It has been found that the foregoing features, particularly the provision of the swivel pins, better assure a perfect seal in all positions of the swivel member since they more effectively prevent the swivel member from separating from the sealing rings, thereby providing a more reliable, and also a more compact, construction. In addition, such a construction automatically vents the second fitting to the atmosphere when the swivel member is moved to its closed position before disconnecting the two fittings, thereby providing an important safety feature when the connector assembly is used with compressed-air driven devices.

More particularly, the connector assembly illustrated in FIGS. 8–10 includes a first fitting 202 having a connector 204 for one conduit, and receivable in another fitting 206 having a connector 208 for the other conduit. Fitting 206 includes a housing 214 enclosing a ball or swivel member 218 formed with a bore 220 angled at its end 222 in the same manner as bore 120 and its angled end 122 in FIG. 6. In the arrangement illustrated in FIGS. 8–10, however, swivel member 218 is swiveled between a pair of spaced pins 221, 223 carried by fitting 206 and extending perpendicularly to the axis of bore 209 in connector 208. Pins 221, 223 are integrally formed in two threadedly-attached sections 214a, 214b of housing 214. A sealing ring 226 is received around pin 221 on one side of bore 220 of swivel member 218, and a second sealing ring 228 is received around pin 223 on the opposite side of the swivel member bore. A further sealing ring 224 is received by connector 208, threadedly attached to housing section 214b, and is pressed against the outer face of the opposite side of swivel member 218.

As in the arrangement illustrated in FIGS. 5–7, connector 204 of fitting 202 is also connectable to swivel member 218 of fitting 206 by means of attachable-detachable coupling members in the form of a plug in one fitting receivable within a socket in the other fitting. However, in the arrangement illustrated in FIGS. 8–10, the attachable-detachable coupling members are reversed as compared to the arrangement in FIGS. 5–7. Thus, a socket 225 is formed in swivel member 218, constituting a part of its bore 220, and is adapted to receive a stem 227, constituting a plug member, carried by fitting 202. Socket 225 of swivel member 218 is lined with a sealing ring 229 engageable with the outer surface of plug 227 of fitting 202 to effect a seal between the two.

As in the FIGS. 5–7 arrangement, housing 214 includes a curved end wall 230 on the outer side facing fitting 202. End wall 230 is formed with a slot having a narrow portion 232a for a part of its length, and a wider portion 232b for the remainder.

Figure 9A:
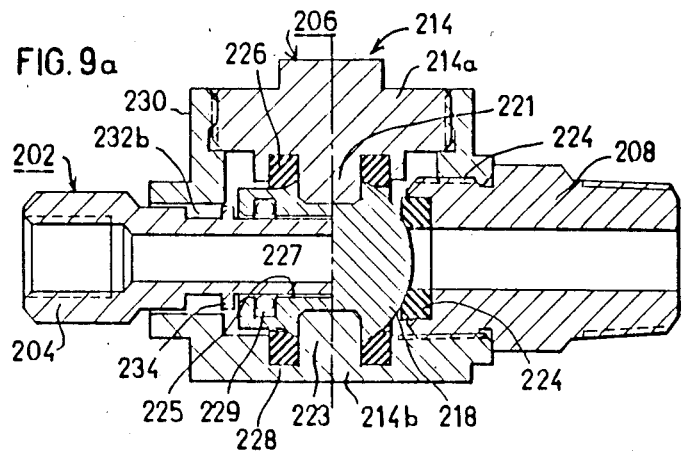
Figure 10A:
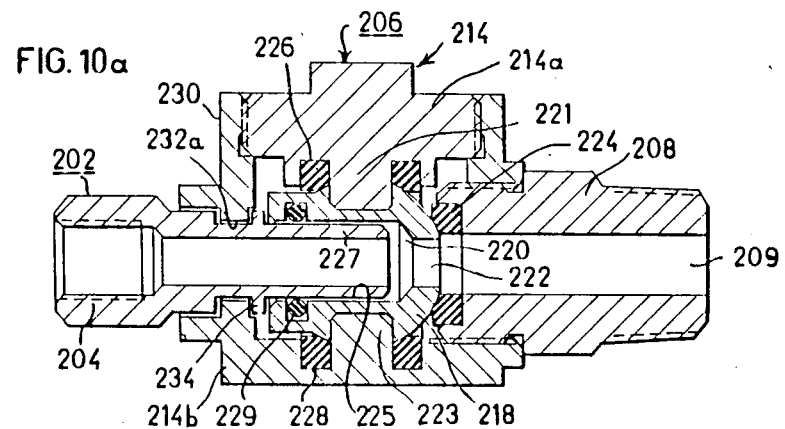

Fitting 202 is formed with an annular rib 234, comparable to rib 134 in FIGS. 5–7, having an outer diameter slightly less than the wide portion 232b of slot 232, as shown in FIG. 9a, but slightly larger than the the narrow portion 232a as shown in FIG. 10a. Thus, plug 227 of fitting 202 can be inserted through end wall 230 of fitting 206 into socket 225 of swivel member 218 only when the plug is located in alignment with the wider portion 232b of slot 232. As shown in FIGS. 9 and 9a, when plug 227 is in this position, swivel member 218 is in its closed condition wherein its angular bore 222 is out of alignment with bore 209 through connector 208, thereby blocking communication between connector 208 and connector 204. Fitting 202 can therefore be attached to fitting 206 only when swivel member 218 is in its closed condition.

When fitting 202 has thus been applied to fitting 206, fitting 202 may then be moved to swivel member 218 to bring its bore 222 into alignment with bore 209 in connector 208, whereupon the connector assembly is in its open condition establishing fluid communication between the two fittings. In this open condition of fitting 202, the narrow portion 232a of slot 232 in the curved end wall 230 bears against the inner end of annular rib 234 of fitting 202 (FIG. 10a), thereby preventing the removal of that fitting from fitting 206.

Whenever it is desired to disconnect fitting 202 from fitting 206, it is first necessary to swivel member 218 to bring its bore 220 out of alignment with bore 209 in connector 208. As soon as this has occurred, the device to which fitting 202 was connected is vented the atmosphere via the space between sealing ring 224 circumscribing bore 209, and the two sealing rings 226, 228 circumscribing the two pins 221, 223. Thus, if the connector assembly is used for coupling a compressed-air driven device connected via fitting 202 to a source of compressed air connected to fitting 206, the foregoing arrangement including the three seals 224, 226 and 228, assure that, as soon as swivel member 218 is moved to its closed position to disconnect the source of compressed air from the compressed-air driven device, the latter device will be first automatically vented to the atmosphere, via the outer surface of the swivel member 218 between seal 224 and the other two seals 226, 228, before the device is disconnected, thereby obviating the need of providing special protective devices for this purpose as is common in such equipment. In addition, the above-described arrangement including the two swivel pins 221, 223, and the three seal 224, 226, 228, better assure a perfect seal when the two fittings are connected together and the swivel member is in its open position.

What is claimed is:

1. A connector assembly for fluid conduits, comprising:
   a first fitting including a connector for one of the conduits;
   a second fitting to which said first fitting is attachable and which includes a connector for the other of said conduits;
   a swivel member within said second fitting, said swivel member being formed with a curved outer surface and a passageway extending therethrough, and being swivable either to an open position establishing communication via said passageway between said two connectors, or to a closed position blocking communication between said two connectors;
   said swivel members being swivelly mounted between a pair of spaced pins carried by said second fitting on opposite sides of said swivel member;
   said second fitting further including a bore alignable with said passageway through said swivel member in the open position thereof;
   a first sealing ring carried by said second fitting circumscribing said bore and bearing against the curved outer surface of said swivel member;
   a second sealing ring carried by said second fitting circumscribing one of said pins and bearing against the outer surface of said swivel member;
   a third sealing ring carried by said second fitting circumscribing the other of said pins and bearing against the outer surface of said sealing member;
   and attaching means carried by said two fittings enabling said first fitting to be attached to said second fitting and to swivel said swivel member to either of its two positions;
   said attaching means including interlocking elements carried by said two fittings which permit said first fitting to be attached to and detached from said second fitting only when said swivel member is in its closed position.

2. The assembly according to claim 1, wherein said swivel member has a spherical outer surface through which said passageway is formed.

3. The assembly according to claim 1, wherein said second fitting comprises a slot of a configuration permitting said first fitting to be coupled to said swivel member of the second fitting only when the swivel member is in its closed position.

4. The assembly according to claim 1, wherein said swivel member is swivable for a partial turn between its open and closed positions.

5. The assembly according to claim 1, wherein said first and second fittings include attachable-detachable coupling members, one carried by said first fitting and the other carried by said swivel member of the second fitting.

6. The assembly according to claim 5, wherein said first fitting further comprises an annular rib around its coupling member, and said second fitting further comprises an end-wall formed with a slot having a first slot portion permitting said annular rib to pass therethrough in order to apply said coupling member of the first fitting to said coupling member of the second fitting only in the closed position of said swivel member, and a second slot portion blocking said annular rib from passing therethrough in the open position of said swivel member.

7. The assembly according to claim 6, wherein said one coupling member is a stem carried by said first fitting, and said other coupling member is a socket formed in said swivel member for receiving said stem.

* * * * *